United States Patent
Haag et al.

(10) Patent No.: US 6,232,684 B1
(45) Date of Patent: May 15, 2001

(54) AUTOMOTIVE DECK LID ACTUATOR

(75) Inventors: Ronald Helmut Haag, Clarkston; Dany Paul Delaporte, Lake Orion; Hassan Anahid, Troy; Neil Mork, Armada, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/358,230

(22) Filed: Jul. 21, 1999

(51) Int. Cl.[7] ............................. H02K 11/00; E05B 47/02
(52) U.S. Cl. ...................... 310/68 R; 70/277; 292/201; 292/DIG. 43
(58) Field of Search ...................... 310/68 R, 89; 70/240, 241, 277, 279; 292/DIG. 42, DIG. 43, 201, 206

(56) References Cited

U.S. PATENT DOCUMENTS

| | | | |
|---|---|---|---|
| 4,845,393 | * 7/1989 | Burgess et al. | 310/51 |
| 5,007,261 | * 4/1991 | Quantz | 70/240 |
| 5,309,052 | * 5/1994 | Kim | 310/51 |
| 5,869,942 | * 2/1999 | Miller et al. | 318/483 |
| 6,175,727 | * 1/2001 | Mostov | 455/307 |

* cited by examiner

Primary Examiner—Nestor Ramirez
Assistant Examiner—Judson H. Jones
(74) Attorney, Agent, or Firm—Patrick M. Griffin

(57) ABSTRACT

An automotive rear deck lid actuator assembly including an electronic filter that reduces electromagnetic interference (EMI) conduction and a shield that limits EMI radiation. The assembly includes a clamshell-type housing closed by a flat metal backplate. An actuator power supply terminal and an actuator ground terminal are supported on the housing and connect the actuator assembly to a vehicle electrical system. An electric motor that drives a latch mechanism is disposed in the housing and includes a motor power supply terminal connected to the actuator power supply terminal and a motor ground terminal connected to the actuator ground terminal. The electronic filter is disposed in the housing is and connected between the motor terminals and the actuator terminals. The shield is disposed in the housing, at least partially surrounds the motor and is connected to ground.

16 Claims, 5 Drawing Sheets

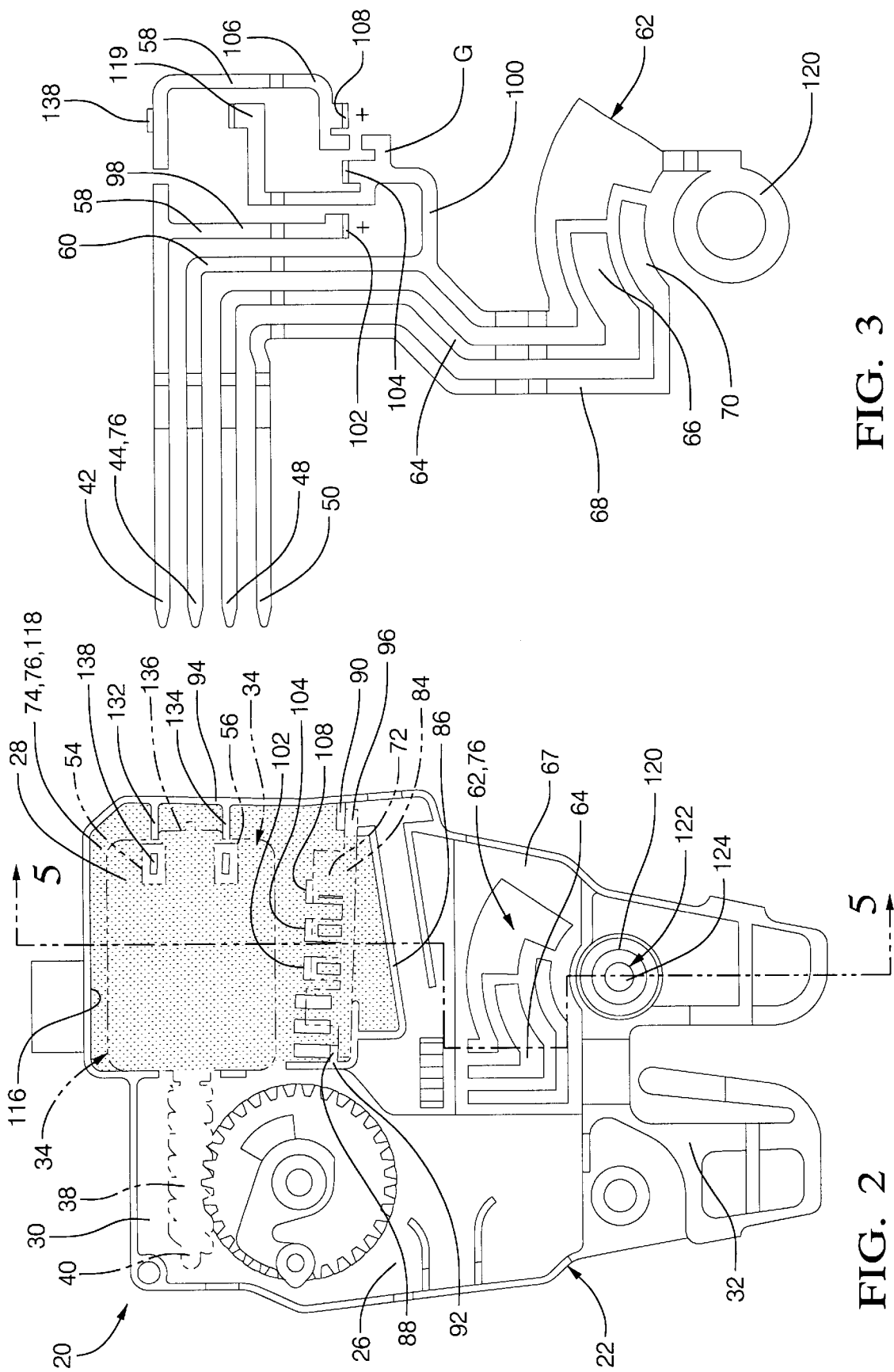

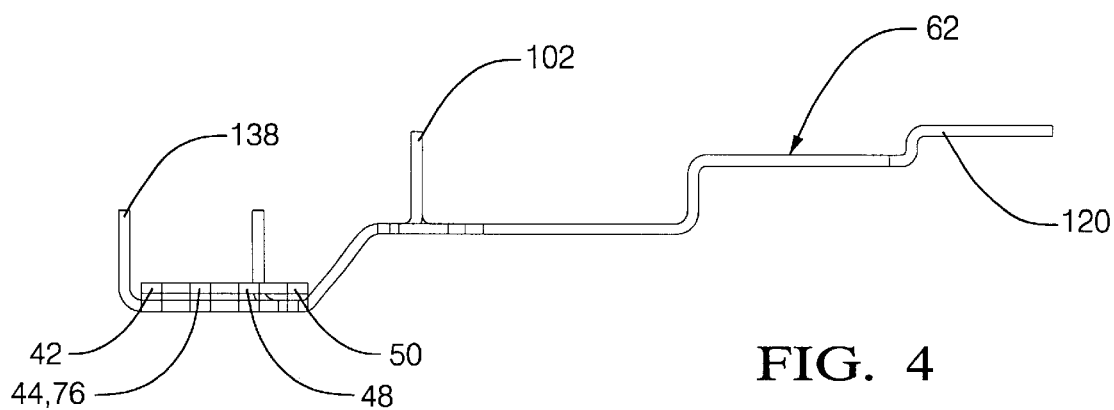
FIG. 4
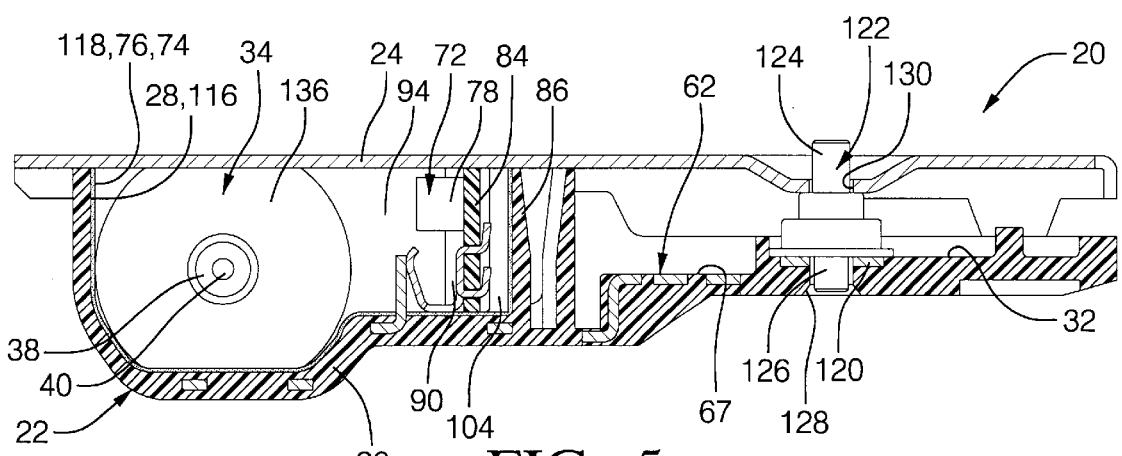
FIG. 5
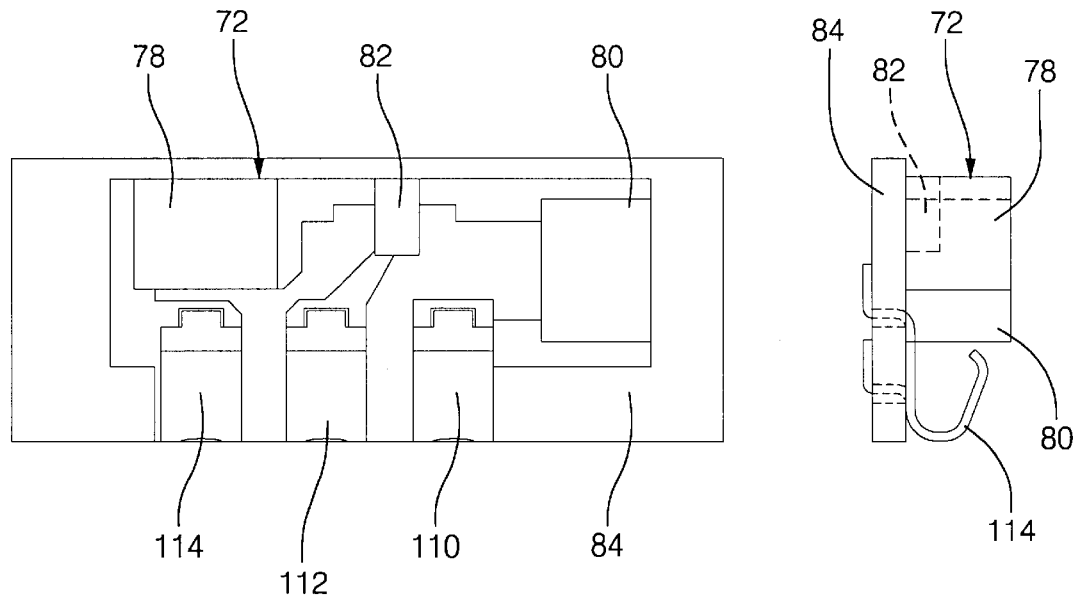
FIG. 6
FIG. 7

AUTOMOTIVE DECK LID ACTUATOR

FIELD OF THE INVENTION

The present invention relates an automotive deck lid actuator.

BACKGROUND OF THE INVENTION

Electromagnetic interference (EMI) can be characterized as undesirable voltages and currents that emanate from one electrical or electronic device and alter or degrade the performance of other electrical and electronic devices that are either proximate or connected to the first device. EMI emissions may transmitted either by conduction through electrical power lines or by radiation through space.

Electric motors such as those used in various actuator assemblies are a significant source of EMI in automotive vehicles. Most EMI emissions from electric motors originate from at least one of two primary sources. One of these sources is electrical arcing that typically occurs between the brush and commutator portions of the motor. EMI emissions that result from electrical arcing are radiated outward from the source and can reach sufficiently far from the source to affect electronic devices in the vehicle—even when there is no common current path between the motor and the affected devices. The other primary EMI source in an electric motor is the interruption of current flow that occurs in the motor commutator as an armature portion of the motor rotates. EMI produced by this source travels to electronic devices in the vehicle by conduction through electrical leads extending from the motor and connected to the vehicle electrical system.

General Motors (GM) has established EMI limits that automotive electric motors must not exceed if they are to avoid degrading electronic devices in the vehicle. To reduce EMI emissions from electric motors to a level below the established limit, it is necessary to reduce the levels of both radiated and conducted EMI that the motors produce.

One method that is known to help minimize EMI conduction is to provide a filter between the EMI source and the affected devices. Such filters are configured to reduce the level of EMI conducted to the affected devices. A method known to reduce EMI radiation is the use of a ground shield that surrounds the EMI source and blocks radiated EMI emissions.

One example of a particularly problematic EMI source is a known rear compartment deck lid actuator assembly that has a very compact configuration and is powered by an electric motor. As shown in FIG. 10, without any EMI reduction, EMI emissions from this known assembly exceed, by a considerable margin, EMI limits established by the manufacturer of the automobile that the actuator is installed in. The manufacturer's EMI limits are represented by line 18.

Due to part integration limitations, it would be undesirable to make actuator assemblies such as the known assembly discussed above larger to accommodate EMI-reducing hardware or to include an EMI-reducing add-on component attached to the side of a plastic housing portion of the actuator assembly.

What is needed is a cost effective method and apparatus for reducing EMI emissions from a rear compartment deck lid actuator assembly.

SUMMARY OF THE INVENTION

An automotive deck lid actuator assembly in accordance with the present invention comprises an actuator power supply terminal and an actuator ground terminal supported on a housing and configured to connect the actuator assembly to a vehicle electrical system. An electric motor is disposed in the housing and includes a motor power supply terminal connected to the actuator power supply terminal and a motor ground terminal connected to the actuator ground terminal. Characterizing the invention is an electronic filter disposed in the housing and connected between the motor terminals and the actuator terminals. The filter is configured to reduce electromagnetic interference conduction into the vehicle electrical system.

An actuator constructed according to the invention emits considerably less electromagnetic interference that prior art actuator assemblies. Therefore, the negative effects of electromagnetic interference on other vehicle-borne electronic devices are reduced.

BRIEF DESCRIPTION OF THE DRAWINGS

The present invention will now be described, by way of example, with reference to the accompanying drawings, in which:

FIG. 2 is a back view of the actuator assembly of FIG. 1 with a backplate removed for clarity;

FIG. 3 is a back view of a terminal stamping of the actuator assembly of FIG. 1;

FIG. 4 is a side view of the terminal stamping of FIG. 3;

FIG. 5 is a cross-sectional side view of the actuator assembly of FIG. 1 taken along line 5—5 of FIG. 2;

FIG. 6 is a bottom view of a printed circuit board of the actuator assembly of FIG. 1;

FIG. 7 is a side view of the printed circuit board of FIG. 6;

DETAILED DESCRIPTION OF PREFERRED EMBODIMENT

Figure 1:
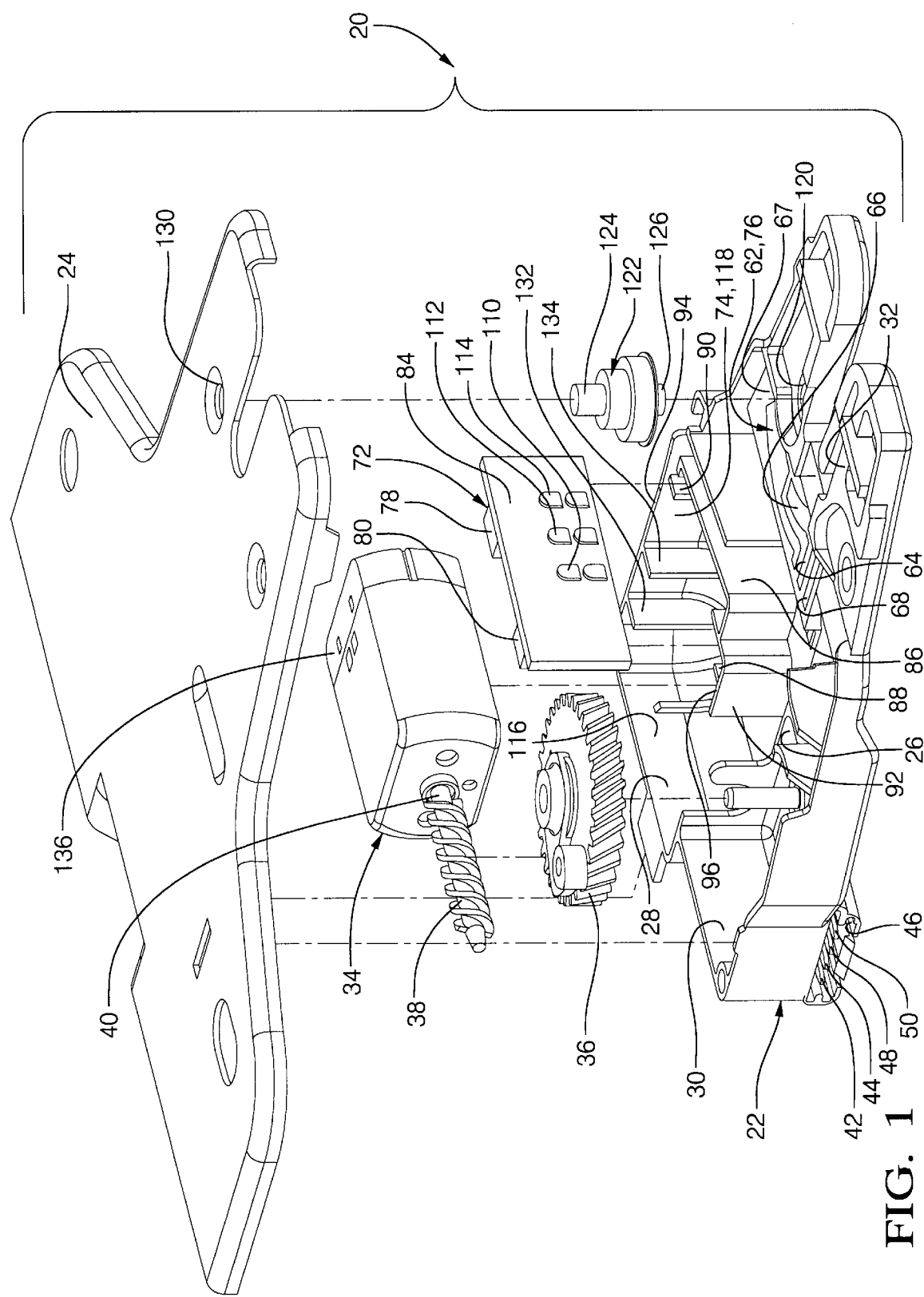
FIG. 1 is an exploded perspective view of an automotive rear deck lid actuator assembly embodying this invention with latch components removed for clarity.

An actuator assembly for releasably latching an automotive rear deck lid is generally shown as 20 in FIGS. 1, 2 and 5. The assembly 20 comprises a plastic partitioned clamshell housing generally indicated at 22 in FIGS. 1, 2 and 5. The clamshell housing 22 is closed by metal back plate shown at 24 in FIGS. 1 and 5. As is best shown in FIG. 2, an upper portion 26 of the housing 22 is partitioned to include a motor chamber 28, a gear chamber 30 and a latch mechanism chamber 32. The actuator assembly 20 is configured to be fastened to an outer lower edge of an automotive rear deck or trunk lid (non-shown) with the latch mechanism chamber 32 oriented downward as shown in FIG. 2. The latch mechanism chamber 32 is configured to house and support a latch mechanism (not shown) that is configured to releasably hold the trunk lid in a closed position. The motor chamber 28 is configured to receive an electric motor generally indicated at 34 in FIGS. 1 and 5 and schematically in FIG. 8. The electric motor 34 is operatively connected to a plastic circular drive gear 36 by a plastic worm gear 38. The drive gear 36 and worm gear 38 are rotatably supported in the gear chamber 30. The worm gear 38 is supported on a motor axle 40 of the electric motor 34. The drive gear 36 is positioned to move the latch mechanism between latched and unlatched positions in response to operation of the motor 34.

An actuator power supply terminal, shown at 42 in FIGS. 1 and 3, and an actuator ground terminal, shown at 44 in FIGS. 1 and 3, are supported on and extend laterally from a plug receptacle opening 46 in the housing 22 as shown in FIG. 1. The actuator power supply terminal 42 and the actuator ground terminal 44 are configured and positioned to connect the actuator assembly 20 to respective 12 volt power supply and ground leads of the vehicle electrical system (not shown). Actuator "decklid ajar" and "interior decklid" terminals 48, 50 are also supported on and extend laterally from the plug receptacle opening 46 in the housing 22. The actuator "decklid ajar" terminal 48 is configured and positioned to connect to a wire of the vehicle electrical system that leads to a "decklid ajar" indicator light disposed in a passenger compartment of the vehicle. The actuator "interior decklid" terminal 50 is configured and positioned to connect to a wire of the vehicle electrical system that leads to a lamp that lights the interior of the trunk compartment when the actuator latch is released and the deck lid opened. The vehicle system includes a power switch (not shown) operable by a vehicle occupant that closes an electrical circuit carrying power from a 12 volt vehicle battery, schematically shown at 52 in FIG. 8, to the motor 34 and actuator assembly 20. This provides vehicle occupants with a means for actuating the actuator assembly 20 to unlatch the rear deck lid from inside the passenger compartment.

The electric motor 34 includes a motor power supply terminal shown in hidden line at 54 in FIG. 2. The motor power supply terminal 54 is connected to the actuator supply terminal 42. The electric motor 34 also includes a motor ground terminal shown in hidden line at 56 in FIG. 2. The motor ground terminal 56 is connected to the actuator ground terminal 44. The motor terminals are connected to the actuator power terminal 42 and the actuator ground terminal 44 by power and ground current paths or traces, respectively. The power and ground terminal traces are shown at 58 and 60 in FIG. 3. The power and ground traces 58, 60 are defined by a terminal stamping generally indicated at 62 in FIGS. 1–5. As is best shown in FIG. 5, the terminal stamping 62 is insert molded into the plastic clamshell housing 22.

The actuator assembly 20 also includes a combination "deck lid ajar/interior deck lid" light switch (not shown) that is part of a forkbolt assembly (not shown) and provides a ground path for deck lid ajar and interior deck lid traces 64 and 68 through the ground terminal trace 60. The switch energizes the "deck lid ajar" light and the interior deck lid light when the lid is not latched shut.

The terminal stamping 62 includes a first portion of a "decklid ajar" electrical current path that includes the "deck lid ajar" trace 64. The "deck lid ajar" trace 64 extends from the actuator "decklid ajar" terminal 48 to a "decklid ajar" contact pad 66 that is molded into an inside surface 67 of the latch mechanism chamber 32 of the housing 22. A second portion of the "decklid ajar" current path (not shown) includes a wire that contacts the "deck lid ajar" contact pad 66 and extends to the "decklid ajar" switch.

The terminal stamping 62 further includes a first portion of an "interior decklid" electrical current path that includes the "interior deck lid" trace 68. The "interior deck lid" trace 68 extends from the actuator "interior decklid" terminal 50 to an "interior decklid" contact pad 70 molded into the inside surface 67 of the latch mechanism chamber 32 of the housing 22. A second portion of the "interior decklid" current path (not shown) contacts the "interior decklid" contact pad 70 and includes a wire that extends to the "interior decklid" switch.

The rear deck lid latch assembly 20 also includes an electronic filter generally indicated at 72 in FIGS. 1, 2, 5–7 and 8. The electronic filter 72 is disposed in the housing 22 and is connected between the motor terminals 54, 56 and the actuator power and ground terminals 42, 44. The filter 72 is configured to reduce the conduction of the electromagnetic interference (EMI) into the vehicle electrical system back along the traces 58, 60 or power leads, and into other devices in the vehicle. To reduce EMI radiation from the motor 34 a shield, shown at 74 in FIGS. 1, 2, 5 and 8 is disposed in the housing 22 and surrounds both the motor 34 and the electronic filter 72 and is connected to a ground plane generally indicated at 76 in FIGS. 1–6 and 8. The combination of the electronic filter 72 and the shield 74 reduces EMI omissions sufficiently to a level well below the automotive vehicle manufacturer's maximum EMI specifications.

Figure 8:
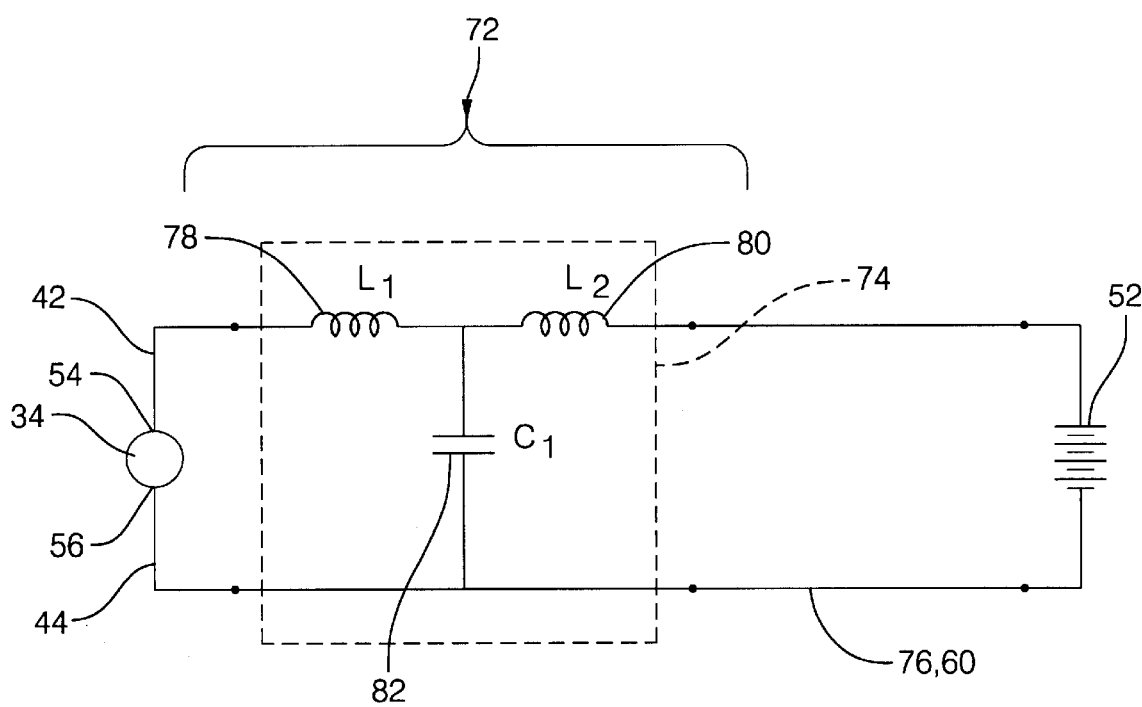
FIG. 8 is an electrical schematic view of a filter circuit included in the printed circuit board of FIG. 7.
Figure 9:
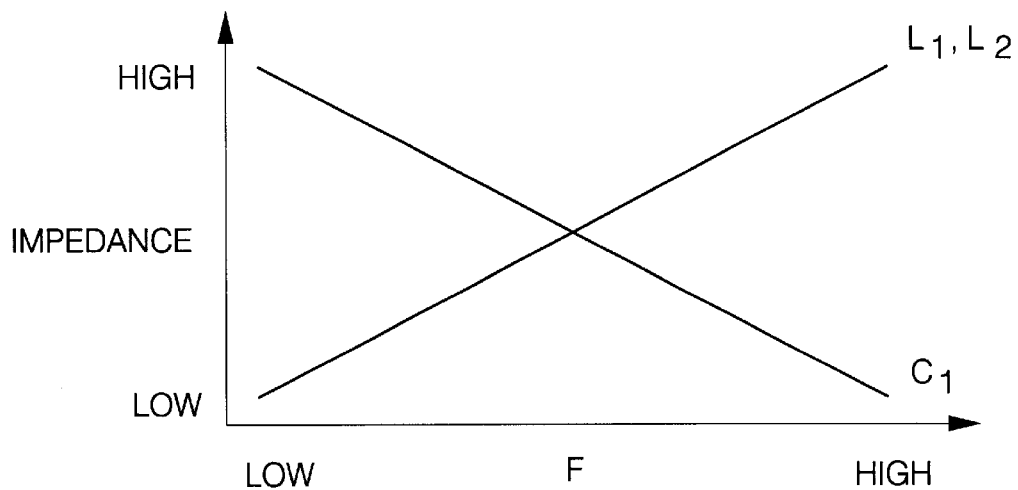
FIG. 9 is a graph showing the impedance of capacitor and inductor components of the filter circuit of FIG. 8 as a function of signal frequency.
Figure 10:
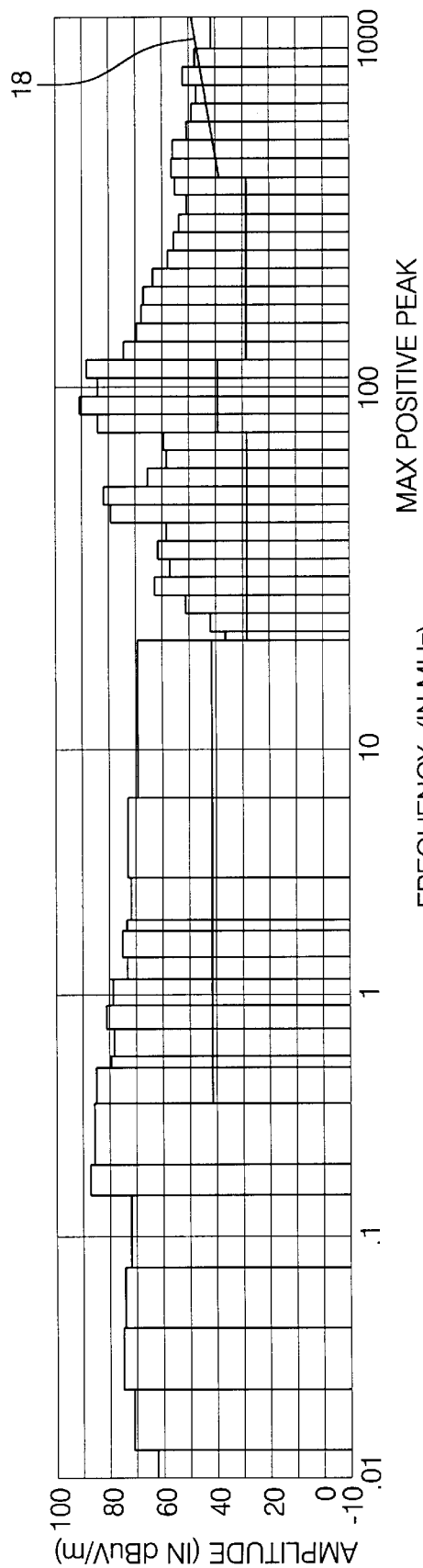
FIG. 10 is graph showing the EMI amplitude of a GM 98 S5S actuator assembly (without filtering or shielding) as a function of signal frequency.

As best shown in the schematic diagram of FIG. 8, the electronic filter 72 is a T filter that includes a combination of circuit components 78, 80, 82 configured to impede high frequency noise currents generated by the motor 34 without impeding the flow of normal operating direct current. The electronic filter circuit components 78, 80, 82 include first and second inductors shown at 78 and 80, respectively, in FIGS. 1, 6, 7 and 8, and a capacitor shown at 82 in FIGS. 6–8. The inductors 78, 80 connected in series with the motor power terminal 42. The first inductor 78 is connected between the motor power terminal 42 and the second inductor 80. As is shown by the line labeled L1, L2 in FIG. 9, the inductors 78, 80 are each configured to appear as high impedance to high frequency currents generated by the motor 34, thus reducing the amplitude of those currents. As is also shown in FIG. 9, the inductors 78, 80 are also configured to appear as low impedance to lower frequency in normal operating direct current.

As best shown in FIG. 8, the capacitor 82 has one lead connected between the first and second inductors 78, 80 and the second lead connected to the trace 60 extending from the motor ground terminal 56 to the actuator ground terminal 44. As shown by the line labeled "C1" in FIG. 9, the capacitor 82 is configured to appear as a lower impedance to high frequency noise currents than the second inductor. This has the effect of shunting high frequency noise currents back to the motor 34. As is also shown in FIG. 9, the capacitor 82 is also configured as high impedance to low frequency currents to prevent normal operating direct current from shunting back to the motor 34. In other words, as the motor 34 turns, motor 34 commutation generates high frequency noise currents. The power leads or traces 42, 44 that extend from the motor 34 to the battery 52 radiate the high frequency noise currents like antenna. The T filter 72 is connected to the power leads 42, 44 near the motor 34 to impede the flow of high frequency noise currents from flowing toward the battery 52 without impeding the flow of normal operating current. From the motor terminals 54, 56 "looking" toward the battery 52, the first inductor 78 appears as a high impedance to the high frequency noise currents and reduces the amplitude of those noise currents. The capacitor 82 appears as much lower impedance to the high frequency noise currents than the remaining path through the second inductor 80 to the battery 52 because the second inductor 80 also appears as high impedance. Therefore, the majority of high frequency noise currents are shunted through the capacitor 82 back to the motor 34 and do not flow past the second inductor 80 toward the battery 52.

The first and second inductors 78, 80 are both ferrite chips, each having an impedance of 750 ohms ($\Omega$)+/−25% @ 100 megahertz (MHz). The capacitor 82 is a 10 nanofarad (nF) ceramic chip capacitor.

The filter components 78, 80, 82 are supported on and interconnected through a printed circuit board shown at 84 in FIGS. 1, 2 and 5–7. The printed circuit board 84 is disposed in the motor chamber 28 of the housing 22. As best shown in FIGS. 6 and 7, the electronic filter components 78, 80, 82 are low profile surface mount devices. Surface mount devices are used so that the printed circuit board 84 and the filter components 78, 80, 82 will fit into a small space adjacent the motor 34 within the motor chamber 28 as best shown in FIG. 5. Between the motor 34 and a lower wall 86 of the motor chamber 28 a pair of plastic tabs, shown at 88 and 90 in FIGS. 1, 2 and 5, extend integrally from respective sidewalls 92, 94 of the motor chamber 28 to form a printed circuit board slot 96 configured to receive the printed circuit board 84 through edge wise insertion.

The terminal stamping 62 insert molded into the housing 22 includes first and second branches, shown at 98 and 100 in FIG. 3, that extend from the respective power and ground traces 58, 60 to first and second rigid printed circuit board slot terminals shown at 102 and 104, respectively, in FIGS. 2–5. The first and second printed circuit board slot terminals 102, 104 project laterally outward into the open space of the motor chamber 28 adjacent the printed circuit board slot 96. The terminal stamping 62 also includes a third branch, shown at 106 in FIG. 3, that connects the motor power terminal 54 to a third rigid printed circuit board slot terminal shown at 108 in FIGS. 2–5. As with the first two printed circuit board slot terminals 102, 104, the third printed circuit board slot terminal 108 projects laterally outward into the open space of the motor chamber 28 adjacent the printed circuit board slot 96. The printed circuit board 84 includes first, second and third spring terminals shown at 110, 112 and 114, respectively, in FIGS. 1, 6 and 7. The spring terminals 110, 112, 114 are positioned to contact the respective first, second and third rigid printed circuit board slot terminals 102, 104, 108 when the printed circuit board 84 is installed in the printed circuit board slot 96.

The shield 74 that attenuates radiated EMI from the motor 34 includes a metallic conductive coating 118 of non-oxidizing copper that is disposed on an inner surface 116 of the motor chamber 28 of the housing 22. The shield 74 is completed by the metal back plate 24 when the back plate 24 is attached over the clamshell housing 22. The ground current path 60 of the terminal stamping 62 includes a grounding input terminal 119 disposed in a position contacting the metallic conductive coating 118 in two different places to insure that the coating 118 is electrically grounded and connected to a ground plane of the printed circuit board 84.

To complete the shield 74 around the motor 34 and printed circuit board 84 the metal back plate 24 is also electrically grounded. The terminal stamping 62 includes a ring terminal shown at 120 in FIGS. 1–5. The ring terminal 120 disposed in the interior surface 67 of the latch mechanism chamber 32 of the housing 22. The ring terminal 120 is connected to the actuator ground circuit terminal 44 of the terminal stamping 62 (which his also the ground circuit terminal for the "ajar" light switch feature). The ring terminal 120 is electrically connected to the back plate 24 by a metal post generally indicated at 122 in FIGS. 1, 2 and 5. The metal post 122 includes upper and lower axial cylindrical extensions shown at 124, 126. The lower cylindrical extension 126 is seated in a complimentary circular recess shown at 128 in FIG. 5. The circular recess 128 is formed into the interior surface 67 of the latch mechanism chamber 32 of housing 22 and is concentrically disposed within the ring terminal. The upper cylindrical extension 124 extends through a complimentary circular aperture 130 in the back plate 24. Therefore, the back plate 24 is grounded to the ground circuit terminal 44 of the terminal stampings through the post 122 and the ring terminal 120. A pair of rivets (not shown) or other suitable fasteners may be crimped over or otherwise fastened to the respective upper and lower cylindrical extensions 124, 126 of the metal post 122 to secure the back plate 24 to the housing 22. The back plate 24 and conductive coating 118 thus cooperate to form the shield 74 around both the motor 34 and the filter 72.

To provide a secondary shield within the above described shield 118, the motor chamber 28 includes two raised ribs 132, 134 that extend integrally outward from one side wall 94 of the motor chamber 28 as shown in FIGS. 1 and 2. The ribs 132, 134 are disposed in a position contacting a metal motor casing 136 of the motor 34 when the motor 34 is installed in a motor chamber 28. Because the ribs 132, 134 are coated with the conductive metal coating 118, the metal motor casing 136 is connected to the motor ground terminal 44. Therefore, the metal motor casing 136 is grounded and acts as an inner EMI shield within an outer EMI shield formed by the conductive coating 118 in the motor chamber 28 and by the back plate 24.

The deck lid actuator is constructed by first forming the terminal stamping 62, separating the traces 58, 60, 64, 68 of the terminal stamping 62 and inserting the separated traces 58, 60, 64, 68 of the terminal stamping 62 into a mold configured to form the clamshell housing 22. A hardenable plastic resin is then provided in the mold and is allowed to cure, forming the plastic clamshell housing 22. Once the housing 22 has been molded, three areas of the inner surface 116 of the motor chamber are masked: an area surrounding the first and third printed circuit board slot terminals 102, 108, and a rigid, outwardly-extending rigid terminal extension 138 of the third branch 58.

After masking, the conductive coating 118 is applied to the inner surface 116 of the motor chamber 28 by suspending copper in a liquid and spraying the resulting solution on the inner surface 116. The solution is then allowed to dry, evaporating the liquid and leaving behind the copper coating 118 on the plastic inner surface 116 of the motor chamber 28. A resistance of less than 2 ohms/inch$^2$ is acquired when the coating 118 is fully dry.

The masking is then removed and the motor 34 is installed in the housing 22 with worm gear 38 attached. The printed circuit board 84 is then inserted into the printed circuit board slot 96. The other assembly components, including the drive gear 36, the latch components and the metal post 122 are then installed. The back plate 24 is then installed with the upper cylindrical extension 124 of the post 122 passing through the complimentary aperture 130 in the back plate 24 and the lower cylindrical extension 126 passing through the complimentary aperture 128 in the housing 22. Finally, the rivets are crimped over the upper and lower cylindrical extensions 124, 126 of the post 122.

Figure 11:
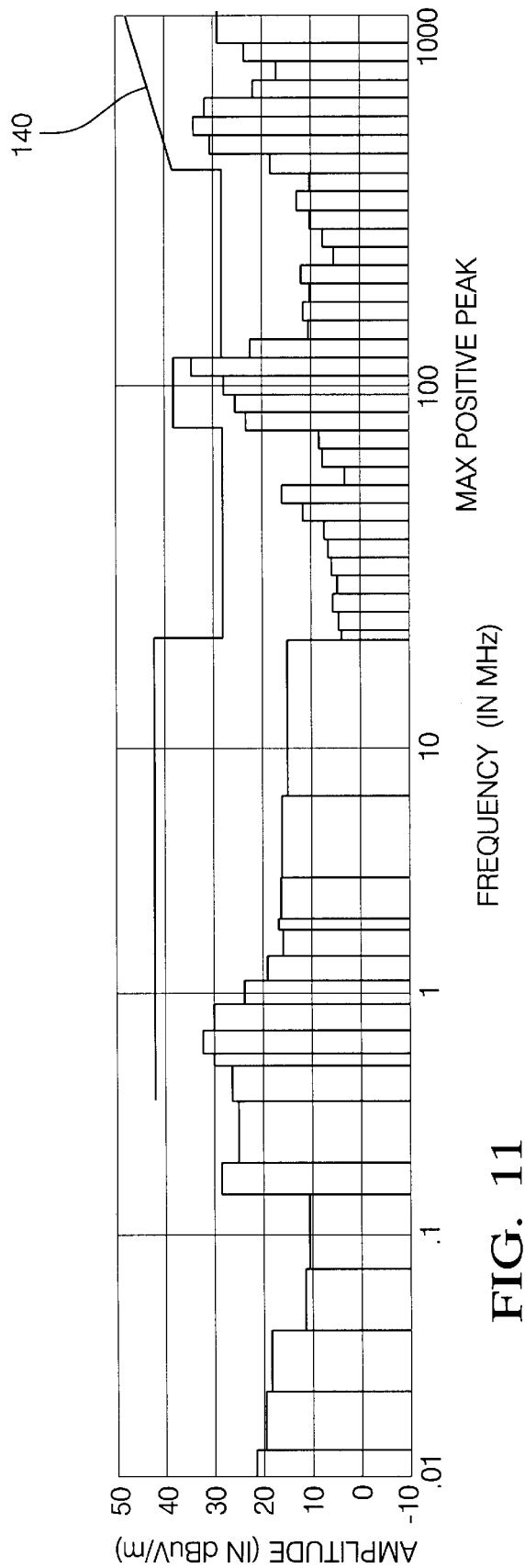
FIG. 11 is a graph showing the EMI amplitude of the actuator assembly of FIG. 1 as a function of signal frequency.

As shown in the graph of FIG. 11, test results show that the T filter 72 and shield 74 cooperate to successfully reduce both conducted and radiated EMI emissions from the electric motor 34 of the actuator assembly 20 to a level below that required by General Motors EMI specifications, the General Motors specified maximum level being indicated by line 140. At the same time, the addition of the T filter 72 and the shield 74 adds very little time and expense to the cost of producing the actuator assembly 20 and the necessary components are small enough to fit within existing space and require no increase in the size of the actuator housing 22.

The T filter 72 and shield 74 are readily adaptable for use with any vehicle deck lid actuator. In adapting the design for such use it may be necessary to change the values of the T filter circuit components to compensate for different EMI specifications, motor types, etc.

We intend this description to illustrate certain embodiments in the invention rather then to limit the invention. Therefore, we have used descriptive words rather than limiting words. Obviously, it's possible to modify this invention from what the description teaches. With in the scope of the claims one may practice the invention other then as described.

What is claimed is:

1. An actuator assembly for releasably latching an automotive rear deck lid, the assembly comprising:
   a housing;
   a latch mechanism disposed in the housing for releasably latching the automotive rear deck lid;
   an actuator power supply terminal and an actuator ground terminal supported on the housing and configured to connect the actuator assembly to a vehicle electrical system;
   an electric motor disposed in the housing for moving the latch mechanism between latched and unlatched positions, the electric motor including a motor power supply terminal connected to the actuator supply terminal and a motor ground terminal connected to the actuator ground terminal, and
   an electronic filter disposed in the housing and connected between the motor terminals and the actuator terminals, the filter being configured to reduce EMI conduction into the vehicle electrical system.
   the filter including a combination of low profile circuit components surface mounted on and interconnected through a printed circuit board disposed in the housing.

2. An actuator assembly as defined in claim 1 in which a shield is disposed in the housing and around the motor and is connected to ground.

3. An actuator assembly as defined in claim 2 in which the combination of circuit components is configured to impede high frequency noise currents generated by the motor without impeding the flow of normal operating current.

4. An actuator assembly for releasably latching an automotive rear deck lid, the assembly comprising:
   a housing;
   an actuator power supply terminal and an actuator ground terminal supported on the housing and configured to connect the actuator assembly to a vehicle electrical system;
   an electric motor disposed in the housing and including a motor power supply terminal connected to the actuator power supply terminal and a motor ground terminal connected to the actuator ground terminal; and characterized by:
   an electronic filter disposed in the housing and connected between the motor terminals and the actuator terminals the filter being configured to reduce EMI conduction into the vehicle electrical system,
   a shield disposed in the housing and around the motor and connected to ground,
   the electronic filter including a combination of circuit components configured to impede high frequency noise currents generated by the motor without impeding the flow of normal operating current, and
   the electronic filter circuit components including:
      first and second inductors connected in series with one of the motor terminals with the first inductor connected between the one motor terminal and the second inductor, the inductors each being configured to appear as a high impedance to high frequency currents generated by the motor; and
      a capacitor having one lead connected between the first and second inductors and a second lead connected to a current path extending from the other of the motor terminals to one of the actuator terminals the capacitor configured to appear as lower impedance to high frequency noise currents than the second inductor and configured to appear as high impedance to low frequency currents.

5. An actuator assembly for releasably latching an automotive rear deck lid, the assembly comprising:
   a housing;
   an actuator power supply terminal and an actuator ground terminal supported on the housing and configured to connect the actuator assembly to a vehicle electrical system;
   an electric motor disposed in the housing and including a motor power supply terminal connected to the actuator power supply terminal and a motor ground terminal connected to the actuator ground terminal; and characterized by:
   an electronic filter disposed in the housing and connected between the motor terminals and the actuator terminals the filter being configured to reduce EMI conduction into the vehicle electrical system,
   a shield disposed in the housing and around the motor and connected to ground,
   the electronic filter including a combination of circuit components configured to impede high frequency noise currents generated by the motor without impeding the flow of normal operating current, and
   the filter circuit components being supported on and interconnected through a printed circuit board disposed in the housing.

6. An actuator assembly as defined in claim 5 in which:
   the housing is partitioned to include a motor chamber configured to receive the motor;
   the motor is disposed in the motor chamber;
   the housing is further partitioned to include a printed circuit board slot in the motor chamber, the printed circuit board slot configured to receive the printed circuit board; and
   the printed circuit board is disposed in the printed circuit board slot.

7. An actuator assembly as defined in claim 5 in which the filter circuit components are surface mount devices.

8. An actuator assembly as defined in claim 5 in which a terminal stamping is disposed in the housing and includes current paths that connect the motor terminals to the filter and the filter to the actuator terminals.

9. An actuator assembly as defined in claim 5 in which:

the current paths include printed circuit board slot terminals that project into the motor chamber adjacent the printed circuit board slot; and the printed circuit board includes spring contacts that contact the printed circuit board slot terminals when the printed circuit board is installed in the printed circuit board slot.

10. An actuator assembly as defined in claim 8 in which the shield includes a metallic conductive coating disposed on an inner surface of the housing.

11. An actuator assembly as defined in claim 10 in which the conductive coating includes non-oxidizing copper.

12. An actuator assembly as defined in claim 10 in which the terminal stamping includes a grounding input terminal disposed in a position contacting the metallic conductive coating.

13. An actuator assembly as defined in claim 10 further including a metal backplate that closes the motor chamber and is electrically grounded.

14. An actuator assembly as defined in claim 13 in which:

the terminal stamping includes a ring terminal disposed in an interior surface of the housing and connected to a ground circuit terminal of the terminal stamping; and the ring terminal is electrically connected to the backplate.

15. An actuator assembly as defined in claim 10 in which:

the motor includes a metal motor casing connected to the motor ground terminal; and the metal motor casing contacts the shield.

16. An actuator assembly as defined in claim 15 in which the motor chamber includes a raised rib disposed in a position to contact the metal motor casing when the motor is installed in the motor chamber, the rib being coated by the conductive metal coating.

* * * * *